March 24, 1970 A. U. DANIELS 3,502,447
COMPOSITIONS OF WEAR RESISTANT MATERIALS BONDED WITH
ELECTRICALLY CONDUCTING NITRIDES AND METALS
Filed Nov. 18, 1968
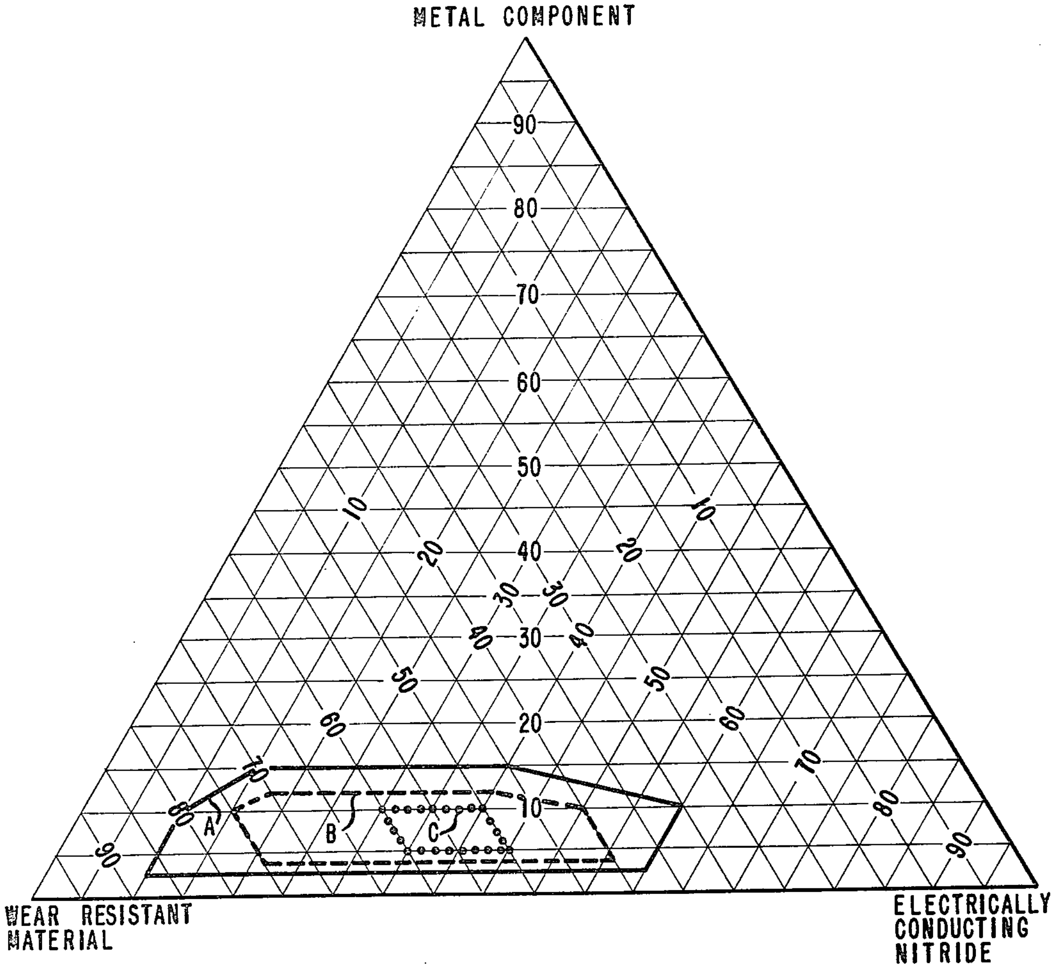
INVENTOR
ALMA U. DANIELS
BY Fred E. McKelvey
ATTORNEY United States Patent Office 3,502,447
Patented Mar. 24, 1970

3,502,447

COMPOSITIONS OF WEAR RESISTANT MATERIALS BONDED WITH ELECTRICALLY CONDUCTING NITRIDES AND METALS

Alma U. Daniels, Wilmington, Del., assignor to E. I. du Pont de Nemours and Company, Wilmington, Del., a corporation of Delaware Filed Nov. 18, 1968, Ser. No. 776,741
Int. Cl. B22f *3/00, 5/00, 7/00;* C22c *29/00, 31/04*
U.S. Cl. 29—182.5 11 Claims

ABSTRACT OF THE DISCLOSURE

Dense, homogeneous compositions having an average grain size less than about 10 microns are disclosed. The compositions comprise:

(1) 30–87% by vol. of alumina, aluminum nitride, zirconia, or mixtures thereof;
(2) 10–60% by vol. of a nitride of titanium tantalum, zirconium, hafnium, niobium, or mixtures thereof; and
(3) 3–15% by vol. of a metal component having:
(A) 50–80% by vol. of tungsten, molybdenum, or mixtures thereof, and
(B) 20–50% by vol. of nickel, iron, cobalt, or mixtures thereof.

The compositions are useful as cutting tools.

BRIEF DESCRIPTION OF THE INVENTION

This invention relates to compositions of matter comprising dense, homogeneous bodies having an average grain size smaller than 10 microns consisting essentially of:

(1) 30 to 87 perecent by volume of a non-electrically conducting, wear resistant material selected from the group consisting of:

(a) alumina,
(b) aluminum nitride,
(c) zirconia, and
(d) mixtures thereof;

(2) 10 to 60 percent by volume of an eletrically conducting nitride selected from the group consisting of:

(a) titanium nitride,
(b) tantalum nitride,
(c) zirconoium nitride,
(d) hafnium nitride,
(e) niobium nitride, and
(f) mixtures thereof; and (3) 3 to 15 percent by volume of a metal component consisting essentially of:

(A) 50 to 80 percent by volume of a metal selected from the group consisting of:

(a) tungsten,
(b) molybdenum, and
(c) mixtures thereof, and (B) 20 to 50 percent by volume of metal selected from the group consisting of:

(a) nickel,
(b) iron,
(c) cobalt, and
(d) mixtures thereof, with the provisos:

(I) that therebe no more than one part by volume of the metal component (3) for every three parts by volume of the wear resistant material (1) and (II) that there be no more than one part by volume of the metal component (3) for each part by volume of the electrically conducting nitride (2).

The invention also relates to the preparation of such compositions and their use as cutting tools.

The compositions of the invention possess a unique combination of wear resistance and toughness which is achieved by carefully balancing the proportions of the components within the above-mentioned ratios.

RELATED ART

The closest known related art is that disclosed in U.S. Patent 3,409,416 and U.S. Patent 3,409,419, both issued Nov. 5, 1968. The former patent discloses compositions wherein the metal component may have up to about 17.1% by volume of a non-refractory metal such as nickel or iron. The latter patent discloses compositions wherein the metal component has at least about 53.5% of a nonrefractory metal.

DESCRIPTION OF THE INVENTION

General

According to the present invention, it has been found that novel and useful bodies comprising electrically conducting nitrides and nonelectrically conducting wear resistant materials may be bonded with refractory metals containing from 20 to 50 percent by volume of a nonrefractory metal such as iron, cobalt and nickel in contrast to related art compositions which contain either less than about 17.1 percent by volume or more than about 53.5 percent by volume of iron group metals, providing certain precautions or limitations are observed in regard to the proportions of the said nitrides and wear resistant materials. Thus, it has been found that from 20 to 50 percent by volume of the metal component can be a nonrefractory metal such as nickel provided that:

(1) The parts by volume of the metal component does not exceed the parts by volume of the electrically conducting nitride;
(2) The parts by volume of the metal component does not exceed about ⅓ of the parts by volume of the wear resistant material;
(3) The metal component constitutes between 3 to 15 percent by volume of the composition;
(4) The electrically conductive nitride is present in amounts which do not exceed 60 percent by volume of the composition; and
(5) The wear resistant material constitutes at least 30 percent by volume of the composition.

Drawing

As mentioned above, the compositions of this invention consist essentially of three ingredients, a wear resistant component, an electrically conducting nitride component, and a metal component. The drawing shows a graphical representation of the amounts of the respective components embraced within the compositional limits of this invention. The area A, outlined by the solid continuous line, represents the broadest range of compositions covered by the invention. The area B, outlined by the dashed line, represents preferred compositions. The area C, outlined by the dotted line, represents the most preferred compositions of this invention.

Nonelectrically conducting wear resistant component

The wear resistant materials are alumina, aluminum nitride, zirconia, and mixtures thereof. These wear resistant materials are used in the compositions of this invention in amounts ranging from 30 to 87 percent by volume. At least 30 percent by volume of wear resistant material must be present to provide a high level of wear resistance. On the other hand, no more than 87 percent by volume may be used so as to allow the use of enough electrically conducting nitrides and metal components to form a body with desirable strength.

It is preferred to have the wear resistant materials present in the compositions of this invention in amounts ranging between 40 and 75 percent by volume, and most preferably between 50 and 60 percent by volume, in that such amounts produce an optimum balance between wear resistance and toughness in the dense bodies of the invention.

The wear resistant materials to be used can be obtained commercially, or can be synthesized by methods well known in the art, and should be sufficiently finely divided to produce compositions with an average grain size of less than 10 microns preferably less than 5 microns.

Of the wear resistant materials, alumina is preferred for dense compositions of this invention as it is readily available and excellent in wear resistance.

Electrically conducting nitride component

The electrically conducting nitride can be titanium nitride, tantalum nitride, zirconium nitride,, hafnium nitride, niobium nitride, and mixtures thereof. These electrically conducting nitrides are used in the compositions of this invention in amounts ranging from 10 to 60 percent by volume. At least 10 percent by volume of electrically conducting nitride must be present to contribute the desired strength to the compositions and to act as a wetting agent for the metal component. However, the electrically conducting nitride should not exceed 60 percent by volume, or it will tend to detract too greatly from the wear resistance of the body. Preferred amounts of the electrically conducting nitride are from 15 to 56 percent by volume, and most preferred amounts are from 30 to 45 percent by volume. These preferred amounts provide the most desirable combination of strength and toughness without detracting from the wear resistance of dense bodies. The electrically conducting nitrides suitable for the use in the compositions of this invention can be obtained commercially, or can be synthesized by methods well known to the art. The nitride should be finely divided to produce compositions with an average grain size of less than 10 microns, and preferably less than 5 microns. If the starting material is appreciably larger than 5 microns in particle size, it can be preground to reduce its size to that which is acceptable. Of the electrically conducting nitrides, titanium nitride is preferred as it is readily available and yields compositions which have an excellent balance of physical properties and are particularly effective when used to cut ferrous alloys.

Metal component

The total amount of metal components in compositions of the invention may range from 3 to 15 percent by volume, with the limitations (1) that the ratio of metal to wear resistant material must not exceed 1:3 and (2) that the ratio of total metal to electrically conducting nitride must not exceed 1:1. Also, the amount of metal component which is tungsten and/or molybdenum must range from 50 to 80 percent by volume, while the amount which is iron, cobalt, nickel, or their mixtures, must range from 20 to 50 percent by volume. These criteria are necessary to provide sufficient strengthening of bodies of the invention without seriously detracting from wear resistance.

Preferred amounts of total metal components are from 4 to 12 volume percent, with the ratio of total metal to wear resistant materials not exceeding 1:4 and the ratio of total metal to electrically conducting nitrides not exceeding 2:3. The most preferred amounts of metal components range from 5 to 10 volume percent.

Among the metals, tungsten and molybdenum are both satisfactory, Nickel is preferred, however, over iron and cobalt for producing bodies of maximum strength and toughness.

In general, at the low total metal levels, high levels of the nonrefractory metals are preferred, and vice versa. In this way, the nonrefractory metals can serve best in aiding in the production of dense, strong bodies of the invention, while detracting as little as possible from wear resistance.

The metal components suitable for use in the compositions of this invention can be obtained as powders from commercial sources, or can be prepared by known methods. The metal powders should be sufficiently finely divided to produce dense compositions of the invention with a metal grain size of less than 10 microns, preferably less than 5 microns.

It is very difficult to determine the form in which the metals are present in dense compositions of the invention. For instance, metal solid solutions or intermetallic phases may form during densification of powder mixtures of the invention, or interactions of the metals with the electrically conducting nitrides or the wear resistant materials may take place. Also, interactions among the wear resistant materials and/or the electrically conducting nitrides are possible. However, for purposes of clarity and simplicity, in discussing the compositions of the invention, the wear resistant materials will be considered to be present as their respective monontrides or their most stable oxides as applicable, the electrically conducting nitrides will be considered to be present as mononitrides, and the metal components will be considered to be in their metallic forms.

Impurities

The various components to be used in the compositions of this invention should preferably be quite pure. In particular it is desired to exclude impurities such as oxygen, which tends to have deleterious effects on the dense compositions of this invention. On the other hand, minor amounts of many impurities can be tolerated with no appreciable loss of properties.

Thus, the metal components can contain small amounts of other metals such as titanium, zirconium, tantalum, hafnium, or niobium, as minor impurities, although low melting metals like lead should be excluded. Also, small amounts of other oxides such as magnesium oxide, silica, and calcium oxide may be present with the wear resistant materials. Small amounts of carbides, such as titanium carbide or zirconium carbide, may also be present. In addition, small portions of tungsten carbide, which is sometimes picked up during grinding, may be present. Oxygen can be tolerated in small amounts, such as those amounts which would be present when titanium nitride has been exposed to air, thereby resulting in a few percent of titanium oxynitrile. However, after the powder components have been milled and dried they are in a highly reactive state, and oxidation, particularly of the metals, occurs easily and should be avoided.

Structural characteristics

In addition to characterizing the compositions of this invention on the basis of the components discussed above, the compositions can also be characterized on the basis of their structural characteristics, i.e., fine grain size and homogeneity.

The dense bodies of this invention are characterized as having a fine grain size smaller than 10 microns and preferably smaller than 5 microns in average grain diameter. Moreover, the grain size is uniform throughout the composition and there is essentially no porosity in the dense compositions of this invention. The fine grain size and low porosity of dense compositions of this invention contribute greatly to its hardness and thus result in bodies which are exceptionally abrasion-resistant. For example, cutting tools made from dense bodies of this invention resist abrasion when coming in contact with the hard carbide inclusions that are found in cast iron.

Distribution of the wear resistant materials, electrically conducting nitrides, and metal components found in dense bodies of this invention is uniform and homogeneous, and, generally speaking, any area 100 microns square which is examined microscopically at 1000× magnification will appear the same as any other area 100 microns square within conventional statistical distribution limits. The combination of fine grain size and homogeneity of distribution of the components in dense bodies of this invention results in bodies which are very resistant to thermal shock both as regards shattering and as regards surface heat-cracking.

Preparation of the compositions

The preparation of the compositions of this invention is important, in that many of the characteristics of the compositions are achieved as a result of the manner in which they are prepared. Thus the use of fine-grained starting materials and thorough milling of the mixed components are directly related to the fine grain size and homogeneity of the compositions. Other precautions observed in preparing the compositions of this invention which have important effects on the product are:

(a) Preventing excessive contamination from grinding media and moisture or oxygen in the air;

(b) Permitting the escape of volatile materials prior to densification through use of proper hot pressing or sintering cycles;

(c) Avoiding excessive reaction with materials such as carbon from pressing molds by limiting the period of contact between molds and bodies of the invention under absorption promoting conditions; and, (d) Avoiding excessive component recrystallization and resultant segregation by properly limiting temperatures and times of densification processes.

Milling of the components to homogeneously intermix them and obtain very fine grain sizes is carried out according to the practices common in the art, e.g., for rotating or vibrating ball mills. Optimum milling conditions for rotating mills will ordinarily involve the use of a mill about half filled with a grinding medium such as alumina or cobalt-bonded tungsten carbide balls or rods, a liquid medium such as a hydrocarbon oil, an inert atmosphere of nitrogen or argon, and grinding periods of from a few days to several weeks, followed by powder recovery, also in an inert atmosphere. The recovered powder is ordinarily dried at temperatures of around 150 to 300° C. under vacuum, followed by both screening and storage in an inert atmosphere.

The compositions of this invention are ordinarily consolidated to dense, pore-free bodies by sintering under pressure. Consolidation is ordinarily carried out by hot pressing the mixed powders in a graphite mode under vacuum.

The hot pressing process normally consists of loading milled and dried powder into a graphite mold or die and inserting the mold into the heated zone of the hot press under the application of a small amount of pressure, or under no pressure, thus allowing volatile impurities to escape before the composition is densified. Full pressure is then usually applied at or near maximum temperature employed.

The mold containing the densified body is then ordinarily ejected from the heated zone of the hot press and cooled rapidly in the course of a few minutes to room temperature while still under vacuum.

Maximum or goal temperatures for hot pressing range between 1400 and 2000° C., depending on the amount of total metal and the proportion of iron, cobalt and nickel and their mixtures which is present. The temperatures will ordinarily be between 1600 and 1900° C. Full pressures used during hot pressing ordinarily range between 500 and 4000 p.s.i., with low pressures being used in combination with lower temperatures for compositions with a high metal content, especially when the metal components are rich in iron, cobalt or nickel or their mixtures. Conversely, higher pressures and temperatures are employed for compositions low in metal, and particularly when the metal is predominantly molybdenum or tungsten or their mixtures.

As would be expected, at higher temperatures and pressures, some of the lower melting metal components may tend to squeeze out of the compositions when pressure is applied. This tendency can be compensated for by starting with a little more iron, cobalt or nickel than is desired in the final body when operating at a high temperature and pressure. By this procedure, some of the iron, cobalt or nickel will be squeezed out during pressing, leaving the body with the desired metal content. Generally speaking, appreciable squeeze-out of metal is to be avoided not only because it changes the composition but also because the metal causes sticking to and damaging of the molds.

It is important that during hot pressing, the compositions not be heated to a goal temperature for a period of time which is much in excess of that required to eliminate porosity and achieve density. Such higher temperatures or longer times can result in excessive grain growth, coarsening of the structure, the development of secondary porosity due to recrystallization, or in the formation of undesirable phases.

As will be demonstrated hereinafter, preferred products of this invention are ordinarily subjected to pressure at maximum temperature for less than 30 minutes, usually no more than 10 minutes, and preferably no more than 5 minutes, after which the product is removed from the hot zone. The resultant bodies are fine grained, homogeneous, essentially pore-free, and are characterized by high hardness and excellent transverse rupture strength.

The compositions of this invention, particularly those with high metal content and small particle sizes, can also be densified by cold pressing, followed by sintering under high vacuum, provided that the above limitation on the use of the minimum necessary sintering time at or near maximum temperature is followed. In cold pressing, it is preferred to isostatically press the powder in a sealed rubber mold, suspended in liquid in an isostatic press capable of applying high pressures (60,000 p.s.i.) hydraulically. The resulting compact is then removed from the mold and transferred to the sintering furnace without being exposed to an oxidizing atmosphere.

Utility

The compositions of this invention can be employed in a variety of types of cutting tools designed for numerous use applications. They can be molded or cut into standardized disposable inserts suitable for operations such as turning, facing, boring, or milling. Or they can be laminated with or otherwise bonded to metal-bonded carbides or tool steels for use as regrindable types of tooling.

They are suitable generally for cutting ferrous metals including wrought or cast irons, wrought or cast steels, steel alloys, nickel-based superalloys, as well as for cutting nonmetallic materials such as fiberglass-plastic laminates and ceramic compositions.

The compositions of this invention are best suited for finishing or semifinishing cuts at very high speeds. These speeds will depend upon the nature of the material to be cut. For instance, class 30 gray cast iron can be cut at speeds in excess of 1200 surface feet per minute, while 4340 steel of maximum hardness (about 54 $R_C$) can be cut at speeds of 300 surface feet per minute or more. These capabilities are due to the great resistance to cratering and edge wear and the retention of high hardness of the compositions of this invention at elevated temperatures. Because of their good thermal shock resistance, they will also withstand making repeated short cuts or other interrupted cuts in which the temperature of the cutting edge fluctuates rapidly.

The compositions of this invention can also be used in general refractory uses such as thread guides, bearings, wear resistant mechanical parts and as grit- and resin-bonded grinding wheels and cutoff blades. In addition, the compositions of this invention are useful in any application where their combination of refractory properties, electrical conductivity, metallophilic nature and thermal shock resistance offers an advantage.

EXAMPLES

This invention will be better understood by reference to the following illustrative examples. Parts and percentages are by weight unless otherwise noted.

EXAMPLE 1

This is an example of a composition containing (1) 30 percent by volume of aluminum nitride, (2) 60 percent by volume of titanium nitride, and (3) 10 percent by volume of metal which comprises (a) 70 percent by volume of tungsten and (b) 30 percent by volume of nickel.

The titanium nitride is prepared as follows:

Two hundred ninety parts of titanium tetrachloride are distilled directly into 3,675 parts of trichloroethylene contained in a four liter resin kettle under an atmosphere of nitrogen. The titanium tetrachloride dissolves in the solvent completely. The solution is then cooled with Dry Ice to about −70° C.

Liquid ammonia is added dropwise while stirring the solution. A total of 152 parts of liquid ammonia are added. As the ammonia is added, a yellow precipitate forms. After completion of the reaction the slurry is allowed to warm to room temperature. The precipitate is then filtered off under a protective atmosphere of nitrogen and stored under nitrogen.

Some of the precipitate is put in an alumina boat and placed in a 2½ inch diameter quartz tube furnace under nitrogen. Ammonia is passed through the tube at a rate of 3 liters per minute.

The temperature of the furnace is first raised quickly to 400° C.; then raised in two hours and forty minutes to 600° C.; then in one hour and forty minutes to 900° C.; and held for two hours. The furnace is then cooled to room temperature; nitrogen is passed through the tube to remove residual ammonia; and the boat containing the sample is removed under a protective atmosphere of nitrogen.

The titanium nitride thus produced is then treated to increase particle size and decrease chloride content by heating it under nitrogen at 1150° C. for 2 hours in an Inconel boat in an Inconel tube furnace heated with "Globar" resistance heaters, and then cooling to room temperature in an atmosphere of nitrogen. The titanium nitride is then removed from the furnace in air and then under a nitrogen atmosphere is screened to −20 mesh. The nitrogen content is about 21 percent, and the surface area is about 4 square meters per gram.

The aluminum nitride is prepared as follows:

Into a molybdenum boat is placed 294 grams of flake aluminum powder coated with about 2.5% stearic acid (Alcoa 552), said aluminum powder having a surface area of 5.5 square meters per grams, to a depth of 2 inches. The exposed surface of the aluminum powder is covered with a ¼" thick carbon felt having a surface area of 150 $m.^2/g.$ and a weight of 5.2 $lb./ft.^2$. The entire assembly of the molybdenum boat, aluminum powder, and carbon felt is placed in a 2½" diameter fused silica tube through which ammonia is passed at the rate of one liter per minute. This ammonia passes in one end of the tube and out the other. This assembly is then slowly heated to 800° C. in about one hour. It is held at 800° C. with a continued ammonia flow for one hour after reaching the temperature of 800° C. The temperature of the system is then raised to 900° C. and maintained at said temperature for 2 hours. Nitrogen is then introduced into the assembly at the rate of one liter per minute and the ammonia flow reduced to 0.1 liter per minute. The reaction system is maintained under these conditions at 900° C. for 2 hours. The nitrided aluminum is cooled to room temperature, removed to a dry box with nitrogen atmosphere and screened through a 14 mesh screen.

The aluminum nitride thus produced is then treated to increase the particle size by heating under a nitrogen atmosphere at 1200° C. for 2 hours in the same type boat and furnace as described above for titanium nitride. After cooling overnight, the aluminum nitride is removed in air and then in a nitrogen atmosphere it is screened to −20 mesh. The nitrogen content is about 31% and the surface area is about 4 $m.^2/g.$ The tungsten is a powder with a surface area of 2.1 $m.^2/g.$, and contains 0.19% oxygen.

The nickel powder has a surface area of 2 $m.^2/g.$, an X-ray crystallite size of 151 millimicrons, and contains 0.07% oxygen.

The powders are milled using 6000 grams of cylindrical, 6% cobalt-bonded tungsten carbide inserts ¼" long and ¼" in diameter, in a 1.3 liter carbon steel rolling mill, about 6" in diameter. The inserts have been previously "worn in" so that contamination of powder batches with cobalt bonded tungsten carbide will be kept to a few percent. The mill is charged with a mixture of 375 milliliters of "Soltrol" 130, a saturated paraffinic hydrocarbon (approximate boiling point 130° C.), 97.7 grams of the titanium nitride 29.4 grams of the aluminum nitride, 40.6 grams of the tungsten, and 8.2 grams of the nickel, all as above described.

The mill is then sealed and rotated at 90 r.p.m. for 5 days. The mill is then opened and the contents emptied while keeping the milling inserts inside. The mill is then rinsed out with "Soltrol" 130 several times until all of the milled solids are removed.

The milled powder and liquid is then transferred to a vacuum evaporator and the excess hydrocrabon is decanted off after the suspended material has settled. The wet residual cake is then dried under vacuum with the application of heat until the temperature within the evaporator is between 200 and 300° C., and the pressure is less than about 0.1 mm. of Hg. Thereafter, the powder is handled entirely in the absence of air.

The dry powder is passed through a 70 mesh screen in a nitrogen atmosphere, and then stored under nitrogen in sealed plastic containers.

A consolidated billet is prepared from this powder by hot pressing the powder in a cylindrical graphite mold having a cylindrical cavity, 1" in diameter which is equipped with opposing close-fitting graphite pistons. One piston is held in place in one end of the mold cavity, while 23 grams of the powder is dropped into the cavity under nitrogen and evenly distributed by rotating the mold and tapping it lightly on the side. The other piston is then put in place under hand pressure. The assembled mold and contents are then placed in the vacuum chamber of a vacuum hot press. The mold is held in a vertical position and the pistons extending above and below are engaged between opposing graphite rams of the press under pressure of about 100 p.s.i. within a period of a minute, the mold is raised into the hot zone of the furnace at 1000° C., and at once the furnace temperature is increased while the positions of the rams are locked so as to prevent further movement during the heat-up period. The temperature is raised from 1000° C. to 1800° C. in about 11 minutes and the temperature of the mold is held at 1800° C. for another 2 minutes to ensure uniform heating of the sample. A pressure of 4000 p.s.i. is then applied to the billet through the pistons for 4 minutes. Immediately after pressing, the mold and contents, still being held between the opposing rams of the hot press, is moved out of the furnace into a cool zone where the mold and contents are cooled to dull red heat in about 5 minutes.

After further cooling, the mold and contents are then removed from the vacuum furnace and the billet is removed from the mold and sandblasted to remove any adhering carbon.

The hot pressed billet is found to be essentially non-porous, having no visible porosity under 1000× magnification. Structurally, the billet is found to consist of a homogeneous mixture of extremely fine grains of three types, presumably titanium nitride, aluminum nitride, and metal. Electron micrographs indicate that few grains of any of the components exceed 1 or 2 microns in size.

Chemical analysis shows, in addition to aluminum nitride, titanium nitride, tungsten, and nickel, the presence of about 3% of iron, presumably attrition from the mill, and about 0.4% of cobalt, and 0.2% carbon, all presumably picked up from attrition of the milling inserts. The billet, which is 1" in diameter, and about 0.300" in thickness, is cut so that a piece slightly larger than ½ inch square is removed from the center. Strips 0.070" in thickness are cut from the material remaining to each side of the center piece, and are further cut into 0.070 x 0.070" square bars for testing transverse rupture strength. Other portions of the billet are used for indentation hardness tests and for other product characterization. The transverse rupture strength as measured by breaking the 0.070" x 0.070" test bars on a 9/16" span is about 141,000 p.s.i. The hardness is 90.2 on the Rockwell A scale.

The square center piece is finished as a cutting tip to ½" x ½" x 3/16", and the corners are finished with a 1/32 radius, a style known in the industry as SNG–432. Cutting tests performed with this tool yield excellent results in the finish turning of class 30 gray cast iron and the finish milling of normalized 4340 steel.

EXAMPLE 2

The procedure of Example 1 is repeated, except that the components are changed to give a hot pressed body containing 50 percent by volume of alumina, 40 percent by volume of titanium nitride, and 10 percent by volume of a metal component containing 50 percent by volume of molybdenum and 50 percent by volume of nickel.

The alumina is prepared from colloidal boehmite by heating for 18 hours in air at 350° C., then increasing the heat at 100° C. per hour to a goal temperature of 1200° C., where it is held for 24 hours. The material is found to be primarily alpha alumina with a surface area of 8.6 $m.^2/g$.

The molybdenum is grade 390–325, has a surface area of 0.29 $m.^2/g.$, and contains 0.21% oxygen.

The hot pressed body is found to have a transverse rupture strength of 145,000 p.s.i. and a Rockwell A hardness of 92.6. The SNG–432 cutting tip of this example is used as a single negative rake tooth in a 4" diameter head to face mill 2" widths of 4340 steel ($36R_C$) on center and dry at 535 s.f.m., 0.0053 i.p.t. and 0.100" depth. After cutting 36 linear inches, the tip is inspected and shows only 0.005" of flank wear. In contrast, a commercial alumina cutting tip tested in the same manner fails by chipping after cutting 4 linear inches.

EXAMPLE 3

The procedure of Example 1 is followed, except that the components are changed to give a hot pressed body containing 74.4 percent by volume of aluminum nitride, 18.6 percent by volume of titanium nitride, and 7 percent by volume of a metal component consisting of 65 percent by volume of tungsten and 35 percent by volume of nickel.

The hot pressed body is found to have a transverse rupture strength of 115,000 p.s.i., and a Rockwell A hardness of 92.0. It is found to be an effective tool for finish turning steel at high speeds.

EXAMPLE 4

The procedure of Example 1 is followed, except that the components are changed to give a hot pressed body containing 50 percent by volume of alumina, 22.5 percent by volume of titanium nitride, 20 percent by volume of tantalum nitride, and 7.5 percent by volume of a metal component containing 50 percent by volume of molybdenum and 50 percent by volume of nickel.

The alumina and molybdenum are as in Example 2.

The tantalum nitride has a surface area of 0.24 $m.^2/g.$ and contains 0.20% oxygen.

The hot pressed body has a transverse rupture strength of 140,000 p.s.i. and a Rockwell A hardness of 91.8. The SNG–432 cutting tip of this example is used as a negative rake tool for turning 1045 steel (183 BHN) dry at 900 s.f.m., 0.005 i.p.r. and 0.050" depth. After 10 minutes the tool is still cutting properly and shows .012" uniform flank wear and no chipping. A commercial alumina cutting tip is tested in the same manner and shows less flank wear (0.006") but shows edge chipping, which causes occasional premature failure.

EXAMPLE 5

The procedure of Example 1 is followed except that the components are changed to give a hot pressed body containing 65 percent by volume of zirconia, 41 percent by volume of zirconium nitride, and 4 percent by volume of a metal component containing 60 percent by volume of tungsten, 20 percent by volume of nickel, and 20 percent by volume of iron.

The zirconium nitride is —325 mesh in size. The zirconia has a surface area of 1 $m.^2/g.$ and is stabilized with 0.1% calcium oxide. The iron has a surface area of 0.7 $m.^2/g.$ and contains 0.37% oxygen.

The hot pressed body has a transverse rupture strength of 125,000 p.s.i. and a Rockwell A hardness of 90.6. A cutting tool from the body performs excellently in high speed finish turning cast iron.

EXAMPLE 6

The procedure of Example 1 is repeated, except that the components are changed to give a hot pressed body containing 40 percent by volume of alumina, 20 percent by volume aluminum nitride, 26 percent by volume titanium nitride, and 14 percent by volume of a metal component containing 80 percent by volume tungsten and 20 percent by volume nickel.

The alumina has a surface area of 13 $m.^2/g.$

The hot pressed body has a transverse rupture strength of 120,000 p.s.i. and a Rockwell A hardness of 92.0. A cutting tip from the body is found to be useful for finish turning and milling of cast iron.

EXAMPLE 7

The procedure of Example 1 is followed except that the components are changed to give a hot pressed body containing 60 percent by volume alumina, 23 percent by volume zirconia, 12 percent by volume titanium nitride, and 5 percent by volume of a metal component containing 40 percent by volume tungsten, 20 percent by volume molybdenum, and 40 percent by volume cobalt.

The alumina is the same as that in Example 6, the zirconia is the same as that in Example 5, and the molybdenum is the same as that in Example 2.

The cobalt powder has a purity of greater than 99.9% and an average particle size of 1 to 1.5 microns.

The body is found to have a transverse rupture strength of 125,00 p.s.i. and a Rockwell A hardness of 93.0. A cutting tip made from the body is found to perform well in the finish turning of 4340 steel (Rockwell C hardness 36).

EXAMPLE 8

The procedure of Example 1 is followed except that the components are changed to give a hot pressed body containing 55 percent by volume alumina, 37.5 percent by volume titanium nitride and 7.5 percent by volume of metal component containing 60 percent by volume molybdenum and 40 percent by volume nickel.

The alumina is the same as that in Example 6 and the molybdenum is the same as that in Example 2.

The hot pressed body has a transverse rupture strength of 145,000 p.s.i. and a Rockwell A hardness of 93.5.

An SNG–432 cutting tip from the body is used as a negative rake tool to finish turn class 30 gray cast iron (170 BHN) dry at 1250 s.f.m., 0.005 i.p.r., and 0.050" depth. After 30 minutes the tool is still performing satisfactorily, and inspection shows only 0.008" uniform flank wear.

The same tip is used as a negative rake tool to finish turn hard 4340 steel ($R_C$ 54) dry at 300 s.f.m., 0.005 i.p.r., and 0.050" depth. After 15 minutes the tool is still performing satisfactorily and inspection shows only 0.008" uniform flank wear.

I claim:

1. A dense, homogeneous composition having an average grain size smaller than 10 microns consisting essentially of:

(1) 30 to 87 percent by volume of an non-electrically conducting, wear resistant material selected from the group consisting of (a) alumina, (b) aluminum nitride, (c) zirconia, and (d) mixtures thereof;

(2) 10 to 60 percent by volume of an electrically conducting nitride selected from the group consisting of (a) titanium nitride, (b) tantalum nitride, (c) zirconium nitride, (d) hafnium nitride, (e) niobium nitride, and (f) mixtures thereof; and (3) 3 to 15 percent by volume of a metal component consisting essentially of:

(A) 50 to 80 percent by volume of a metal selected from the group consisting of (a) tungsten, (b) molybdenum, and (c) mixtures thereof, and (B) 20 to 50 percent by volume of a metal selected from the group consisting of (a) nickel, (b) iron, (c) cobalt, and (d) mixtures thereof, with the provisos:

(I) that there be no more than one part by volume of the metal component (3) for every three parts by volume of the wear resistant material (1), and (II) that there be no more than one part by volume of the metal component (3) for each part by volume of the electrically conducting nitride (2).

2. The composition of claim 1 wherein the wear resistant material is alumina.

3. The composition of claim 1 wherein there is present between 50 to 60 percent by volume of the wear resistant material.

4. The composition of claim 1 wherein the electrically conducting nitride is titanium nitride.

5. The composition of claim 1 wherein the electrically conducting nitride is tantalum nitride.

6. The composition of claim 1 wherein the electrically conducting nitride is zirconium nitride.

7. The composition of claim 1 wherein there is present between 30 to 45 percent by volume of the electrically conducting nitride.

8. The composition of claim 1 wherein the metal (3) (B) is nickel.

9. The composition of claim 1 wherein there is present between 5 to 10 percent by volume of the metal component.

10. The composition of claim 1 wherein the average grain size is less than 5 microns.

11. A dense, homogeneous composition having an average grain size smaller than 10 microns consisting essentially of:

(1) 50 to 60 percent by volume of alumina;

(2) 30 to 45 percent by volume of titanium nitride; and (3) 5 to 10 percent by volume of a metal component consisting essentially of (A) 50 to 80 percent by volume of a metal selected from the group consisting of (a) tungsten, (b) molybdenum, and (c) mixtures thereof, and (B) 20 to 50 percent by volume of nickel, with the provisos:

(I) that there be no more than one part by volume of the metal component (3) for every three parts by volume of the wear resistant material (1), and (II) that there be no more than one part by volume of the metal component (3) for each part by volume of the electrically conducting nitride (2).

References Cited

UNITED STATES PATENTS

| | | | |
|---|---|---|---|
| 3,409,416 | 11/1968 | Yates | 75—205 X |
| 3,409,417 | 11/1968 | Yates | 29—182.5 |
| 3,409,418 | 11/1968 | Yates | 29—182.5 |
| 3,409,419 | 11/1968 | Yates | 75—205 X |

BENJAMIN R. PADGETT, Primary Examiner

ARTHUR J. STEINER, Assistant Examiner

U.S. Cl. X.R.

75—205, 206